(12) United States Patent
Decuir

(10) Patent No.: US 6,698,539 B2
(45) Date of Patent: Mar. 2, 2004

(54) INTAKE APPARATUS FOR FEEDING AIR TO ENGINE COMPARTMENT

(75) Inventor: Alex Decuir, Pinion Hills, CA (US)

(73) Assignee: Almarv, LLC, Los Angeles, CA (US)

( * ) Notice: Subject to any disclaimer, the term of this patent is extended or adjusted under 35 U.S.C. 154(b) by 0 days.

(21) Appl. No.: 10/118,035

(22) Filed: Apr. 9, 2002

(65) Prior Publication Data

US 2003/0188902 A1 Oct. 9, 2003

(51) Int. Cl.[7] .............................................. B60K 13/06
(52) U.S. Cl. ....................... 180/68.3; 180/225; 180/229
(58) Field of Search .......................... 180/68.1, 68.2, 180/68.3, 311, 312, 225, 229; 296/78.1, 208

(56) References Cited

U.S. PATENT DOCUMENTS

| | | | | | |
|---|---|---|---|---|---|
| 2,637,592 | A | * | 5/1953 | Karlby | 296/188 |
| 4,354,570 | A | * | 10/1982 | Tanaka et al. | 180/219 |
| 4,438,828 | A | * | 3/1984 | Nakagawa | 180/219 |
| 4,495,773 | A | * | 1/1985 | Inoue et al. | 60/605.1 |
| 4,516,650 | A | * | 5/1985 | Yamaguchi et al. | 180/68.3 |
| 4,706,615 | A | * | 11/1987 | Scadding | 123/41.01 |
| 4,709,774 | A | * | 12/1987 | Saito et al. | 180/229 |
| 5,901,672 | A | * | 5/1999 | Suzuki et al. | 123/41.49 |
| 6,012,436 | A | * | 1/2000 | Boutcher | 123/559.1 |
| 6,035,955 | A | * | 3/2000 | Suzuki et al. | 180/68.1 |
| 6,276,482 | B1 | * | 8/2001 | Moriya et al. | 180/229 |
| 6,422,332 | B1 | * | 7/2002 | Takata et al. | 180/68.3 |

FOREIGN PATENT DOCUMENTS

| | | | | | |
|---|---|---|---|---|---|
| JP | 408091057 | A | * | 4/1996 | B60K/11/08 |
| JP | 409099746 | A | * | 4/1997 | B60K/13/02 |
| JP | 2002124123 | | * | 4/2002 | F21V/29/02 |

* cited by examiner

Primary Examiner—Brian L. Johnson
Assistant Examiner—Bridget D Avery
(74) Attorney, Agent, or Firm—Liniak, Berenato & White

(57) ABSTRACT

An apparatus for feeding fresh ambient air to an internal combustion engine of a motor vehicle, includes a front lamp assembly with an ambient air intake tract associated with the lamp assembly for providing an air communication passage between an exterior of the motor vehicle and an engine compartment. The air intake tract is adapted to direct an ambient air to an engine compartment bypassing an engine cooling radiator. The air intake tract is in the form of a flattened funnel secured to a lamp housing.

23 Claims, 18 Drawing Sheets

INTAKE APPARATUS FOR FEEDING AIR TO ENGINE COMPARTMENT

BACKGROUND OF THE INVENTION

1. Field of the Invention

The present invention relates to air intake systems for motor vehicles, and more particularly to an air intake tract associated with a vehicle lamp assembly for introducing fresh air to an engine compartment of the motor vehicle.

2. Description of the Prior Art

Conventionally, a typical motor vehicle, such as a truck illustrated in FIG. 1, includes a body supported by wheels (not shown) and driven by an engine. The truck body has a front end 1 including an engine compartment 2 enclosed between fender panels 3, and a front panel 4. The engine compartment 2 houses the internal combustion engine (not shown) and an engine coolant radiator 5. The front panel 4 of the vehicle further defines a generally rectangular ambient air inlet 6 usually covered with a grill 7, and provides support for a plurality of vehicle lamp assemblies 10. Typically the radiator 5 is arranged in front of the engine and behind the grill 7 of the ambient air inlet 6.

During the operation of the truck, the engine needs a constant supply of fresh ambient air for the combustion process. Typically, ambient air enters the engine compartment 2 by passing through the ambient air inlet 6 and the radiator. Then, air from the engine compartment 2 enters into an air filter 8 through a suction pipe 9.

In order to improve a volumetric efficiency and increase an output power of the internal combustion engine, it is desirable that cold air be supplied to the engine cylinders. It is especially important for large, diesel-powered trucks and other vehicles, which often employ turbo-charged intake air systems. However, air entering the engine compartment 2 through the radiator is heated by the radiator 5 and is somewhat warmer, than the ambient air, thus worsening the volumetric efficiency and reducing the output power of the internal combustion engine.

Therefore, there is a need for an apparatus for feeding cold fresh ambient air to the engine compartment of the motor vehicle that could easily retrofit previously manufactured motor vehicles.

SUMMARY OF THE INVENTION

The present invention provides an intake apparatus for feeding cold fresh ambient air to the engine compartment of the motor vehicles, especially beneficial for turbo-charged diesel-powered trucks.

The apparatus for feeding cold fresh ambient air to the engine compartment of the motor vehicles in accordance with the preferred embodiment of the present invention, comprises a front lamp assembly having an ambient air intake tract associated with the lamp assembly for providing an air communication passage between an intake port open to an exterior of the motor vehicle, and an exhaust port open to an engine compartment.

In accordance with the first exemplary embodiment of the present invention, the air intake tract is in the form of a flattened funnel adjacent to a lamp housing.

In accordance with the second exemplary embodiment of the present invention, the air intake tract includes the intake port in the form of a plurality of apertures formed in a lens of the lamp assembly, and the exhaust port in the form of a hole formed in a lamp housing.

In accordance with the third exemplary embodiment of the present invention, both the intake port and the exhaust port are separately formed in the lamp housing, and the air feeding apparatus is provided with an air deflector for directing the ambient air from an ambient air inlet of the motor vehicle in front of an engine coolant radiator to the intake port of the air intake tract.

In accordance with the forth exemplary embodiment of the present invention, both the intake port and the exhaust port are separately formed in the lamp housing, and the air feeding apparatus is provided with a flattened conical air intake scoop for directing the ambient air from an ambient air inlet of the motor vehicle in front of an engine coolant radiator to the intake port of the air intake tract.

Therefore, the present invention provides a simple and inexpensive apparatus for feeding the engine compartment with cool fresh air not heated by the radiator, and is particularly beneficial to motor vehicles powered with turbo-charged diesel engines in order to improve their volumetric efficiency and increase output power thereof. Moreover, the present invention could easily retrofit previously manufactured motor vehicles.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
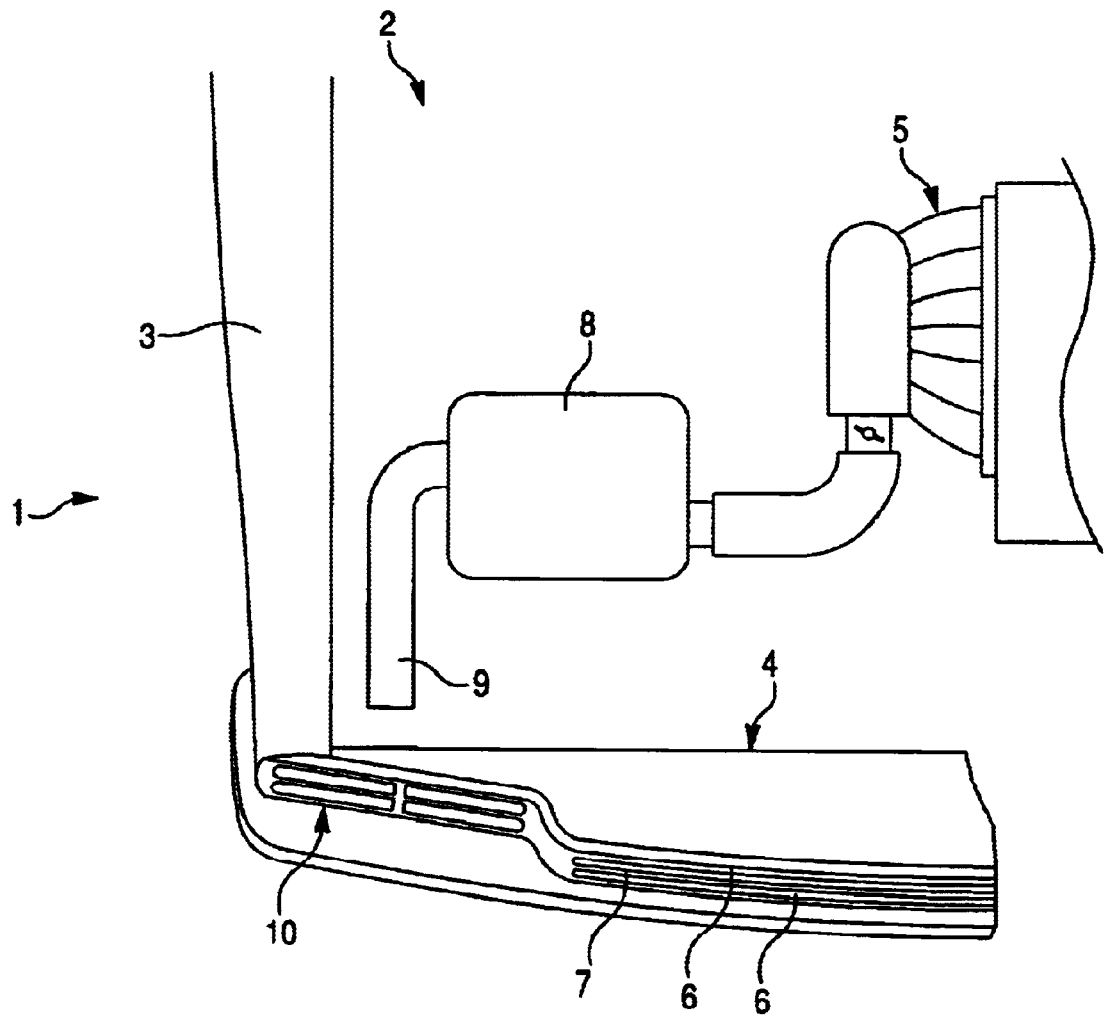
FIG. 1 is a partial plan view of a front end and an engine compartment of a typical motor vehicle.
Figure 2:
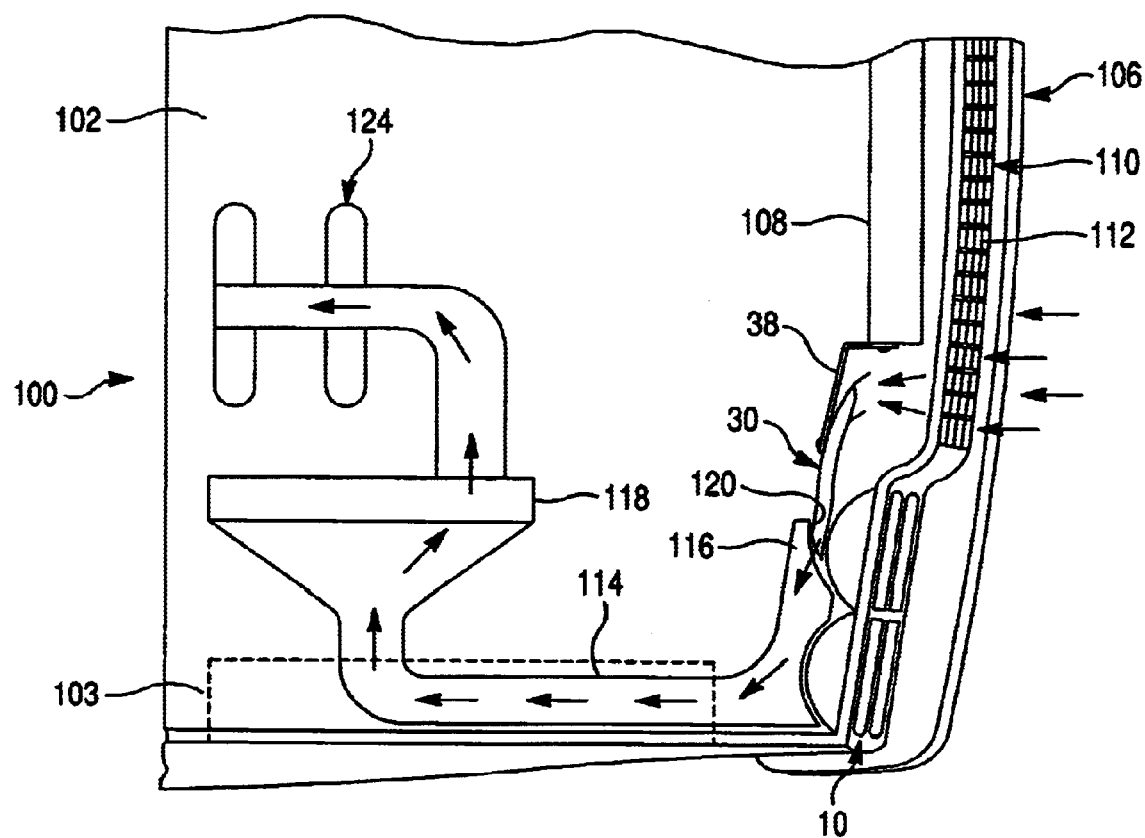
FIG. 2 is a partial plan view of a front end and an engine compartment of a motor vehicle having an air intake apparatus in accordance with the first embodiment of the present invention.
Figure 3:
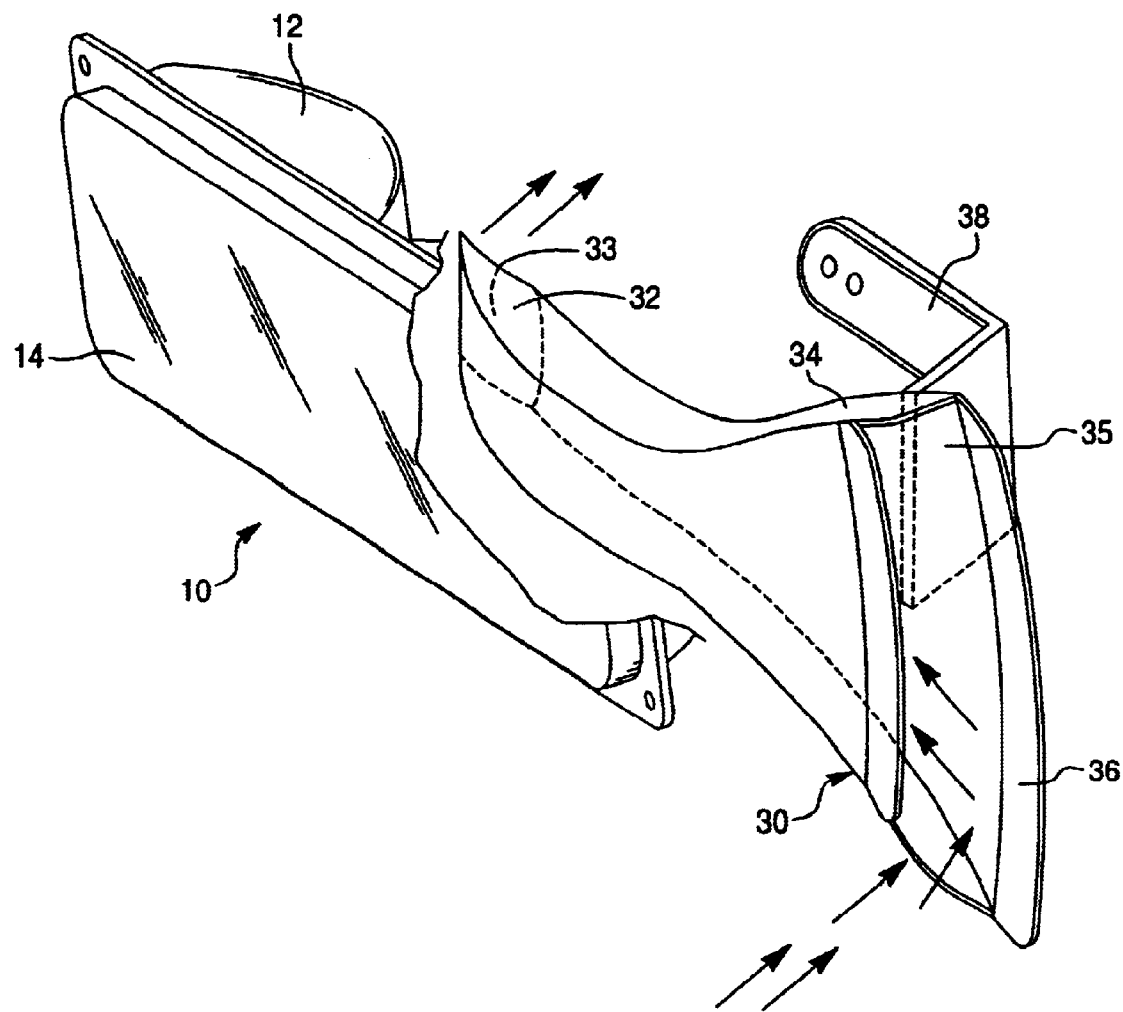
FIG. 3 is a perspective view of the air intake apparatus in accordance with the first embodiment of the present invention.

FIGS. 2 and 3 of the drawings illustrate the first exemplary embodiment of an apparatus for feeding air to an internal combustion engine of a motor vehicle, such as a truck illustrated in FIG. 2, which includes a body supported by wheels (not shown) and driven by a turbo-charged diesel engine (not shown). The truck body has a front end 100 including an engine compartment 102 enclosed between fender panels 104, and a front panel 106. The engine compartment 102 houses the internal combustion engine (not shown) and an engine coolant radiator 108. The front panel 106 of the vehicle further defines a generally rectangular ambient air inlet 110 usually covered with a grill 112. Typically the radiator 108 is arranged in front of the engine and behind the grill 112 of the ambient air inlet 110.

The apparatus for feeding air includes at least one lamp assembly 10 mounted to opposite sides of the front panel 106 of the motor vehicle, as shown in FIG. 2. Preferably, two lamp assemblies 10 are mounted on the left side of the front panel 106 of the truck. Each lamp assembly 10, illustrated in detail in FIG. 3, conventionally includes a lamp housing 12, and a lens member 14 fastened to the lamp housing 12 by any appropriate means well known in the prior art. The lamp housing 12 forms an enclosed cavity adapted to enclose a light source (not shown) that may be an incandescent, tungsten halogen, HID or similar light source. The light source is coupled through a rear opening (not shown) in the lamp housing 12 to expose the light source in the enclosed cavity, where the generated light is reflected from a reflective portion of the housing 12 and projected forward through the lens member 14 as a formed beam pattern.

The lamp assembly 10 further includes an ambient air intake tract in the form of a conical air intake scoop 30 located adjacent to the lamp housing 12 opposite to the lens member 14.

As illustrated in FIG. 3, the air intake scoop 30 is in the shape of a flattened funnel and comprises a proximal end 32 having a first opening 33 open to the engine compartment 102 and defining an exhaust port of the air intake tract, and a distal end 34 having a second opening 35 defining an intake port of the air intake tract.

Ambient air from the exhaust port 33 of the ambient air intake tract of the lamp assembly 10 is supplied to an air filter 118 of the internal combustion engine through an air intake duct 114 disposed substantially above a wheel well 103. The air filter 118 is, in turn, in fluid communication with a turbocharger 124, as shown in FIG. 2.

Figure 4:
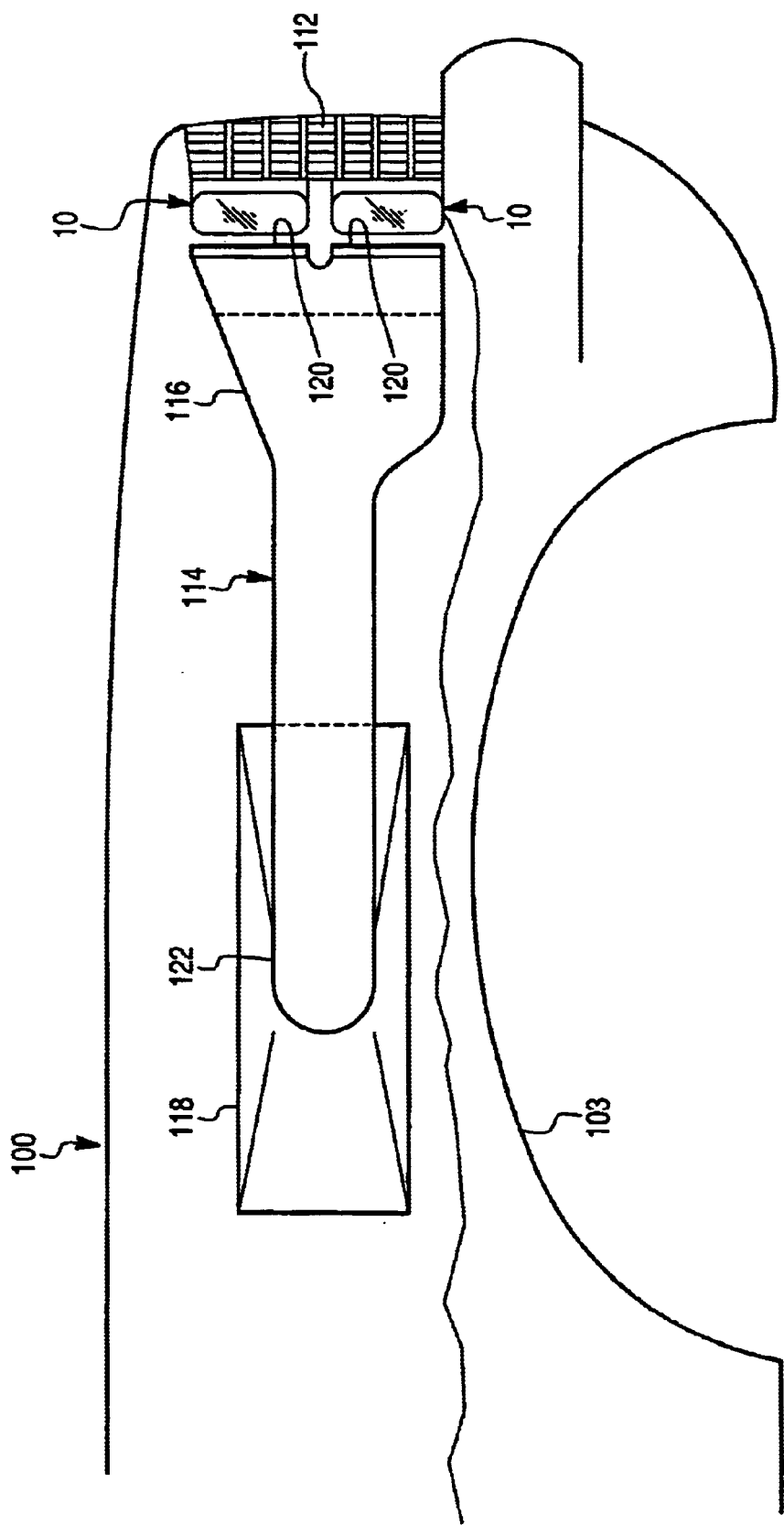
FIG. 4 is a partial side view of the front end and the engine compartment of the motor vehicle having the air intake apparatus in accordance with the first embodiment of the present invention.

The air intake duct 114 has a first end 116 forming an intake opening 120 and a second end 122 forming an outlet opening. The second end 122 of the air intake duct 114 is attached to the air filter 118. As shown in FIG. 4, the first end 116 of the air intake duct 114 has two vertically spaced intake openings 120, each disposed adjacent to the openings 35 of the lamp assemblies 10.

The proximal end 32 of the intake scoop 30 is located adjacent to the lamp housing 12 opposite to the lens member 14, so that the first opening 33 is substantially aligned with the intake opening 120 of the intake duct 114. The distal end 34 of the intake scoop 30 is disposed behind the ambient air inlet 110. Moreover, the distal end 34 of the air intake scoop 30 is provided with an integral air deflector lip 36 laterally projecting therefrom, as shown in FIG. 3. The air deflector lip 36 is adapted for directing the ambient air from the ambient air inlet 110 of the truck to the second opening 35 of the distal end 34 of the air intake scoop 30.

The air intake scoop 30 further includes a support bracket 38 for securing thereof to a support structure within the engine compartment 102 that may be any appropriate part of the front end 100 of the vehicle, such as the radiator 108 or the front panel 106. The support bracket 38 is fastened to the air intake scoop 30 by any appropriate means known in the art, such as adhesive bonding or welding. Alternatively or in addition to the support bracket 38, the proximal end 32 of the intake scoop 30 can be attached directly to the lamp housing 12 opposite to the lens member 14 by any appropriate means well known in the art, such as riveting, adhesive bonding, etc., so that the first opening 33 is substantially aligned with the intake opening 120 of the intake duct 114.

In operation, as illustrated in FIG. 2, cold fresh ambient air directed by the air deflector lip 36 from the ambient air inlet 110 of the motor vehicle, enters the air intake scoop 30, travels through the air intake scoop 30, and enters the engine compartment 102 through the a first opening 33 in the proximal end 32 of the air intake scoop 30. Then fresh ambient air enters the intake openings 120 of the air intake duct 114, as the intake openings 120 are disposed in close proximity to the first opening 33 of the air intake scoop 30. The air intake duct 114 directs ambient air to the air filter 118, then to the turbocharger 124.

With the arrangement of the lamp assembly 10 described above, fresh ambient air enters the engine compartment 102, more particularly the turbocharger 124, bypassing the engine radiator 108. Thus, the present invention provides the turbocharger 124 with substantial amount of relatively cool fresh air not heated by the radiator 108.

Moreover, previously manufactured motor vehicles having conventional air intake system, may be easily retrofit with the lamp assembly 10 of the present invention in order to improve a volumetric efficiency and increase an output power of the internal combustion engine, especially turbocharged diesel engines typically powering heavy-duty trucks.

FIGS. 5–9 of the drawings illustrate the second exemplary embodiment of an apparatus for feeding air to an internal combustion engine of a motor vehicle. Components, which are unchanged from, or function in the same way as in the first exemplary embodiment depicted in FIGS. 2–4 are labeled with the same reference numerals, sometimes without describing detail since similarities between the corresponding parts in the two embodiments will be readily perceived by the reader.

A lamp assembly 210 of the second exemplary embodiment includes a lamp housing 212, and a lens member 214 fastened to the lamp housing 212 by any appropriate means well known in the prior art. The lamp housing 212 forms an enclosed cavity 216 adapted to enclose a light source (not shown) that may be an incandescent, tungsten halogen, HID or similar light source. The light source is coupled through a rear opening 218 in the lamp housing 212 to expose the light source in the enclosed cavity 216, where the generated light is reflected from a reflective portion of the housing 212 and projected forward through the lens member 214 as a formed beam pattern.

Figure 5:
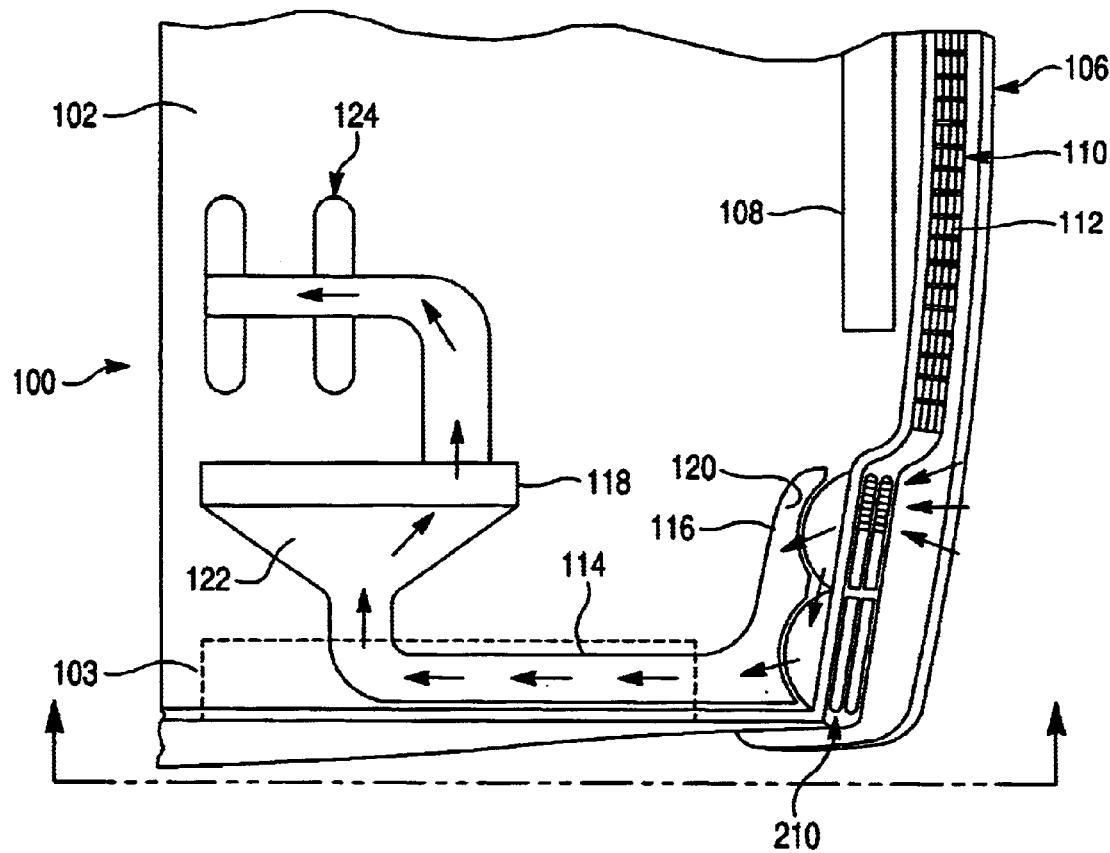
FIG. 5 is a partial plan view of a front end and an engine compartment of a motor vehicle having an air intake apparatus in accordance with the second embodiment of the present invention.
Figure 6:
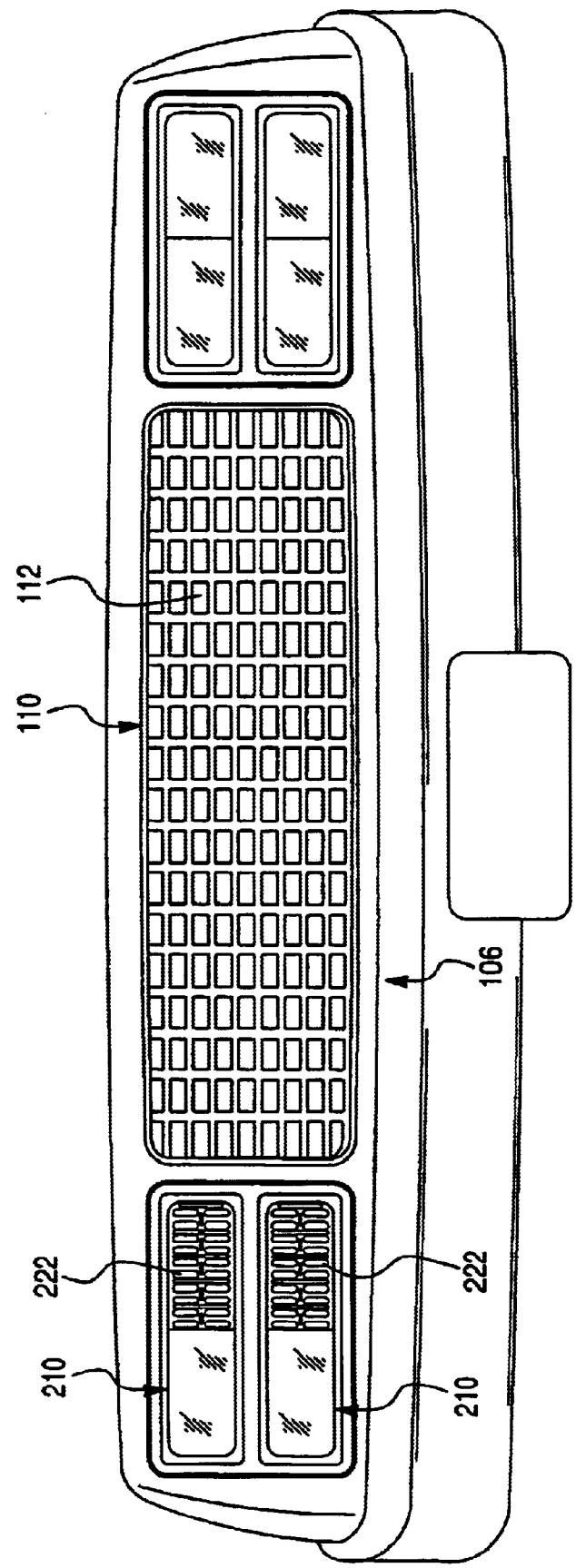
FIG. 6 is a front view of the front panel of the motor vehicle having the air intake apparatus in accordance with the second embodiment of the present invention.

The lamp assembly 210 further includes an ambient air intake tract having an intake port 222 open to ambient air outside the front panel 106 of the vehicle, and an exhaust port 224 open to an engine compartment 102 enclosed between fender panels 104, and the front panel 106, as shown in FIG. 5. The ambient air intake tract, thus, extends between the intake port 222 and the exhaust port 224 through the enclosed cavity 216.

Figure 7:
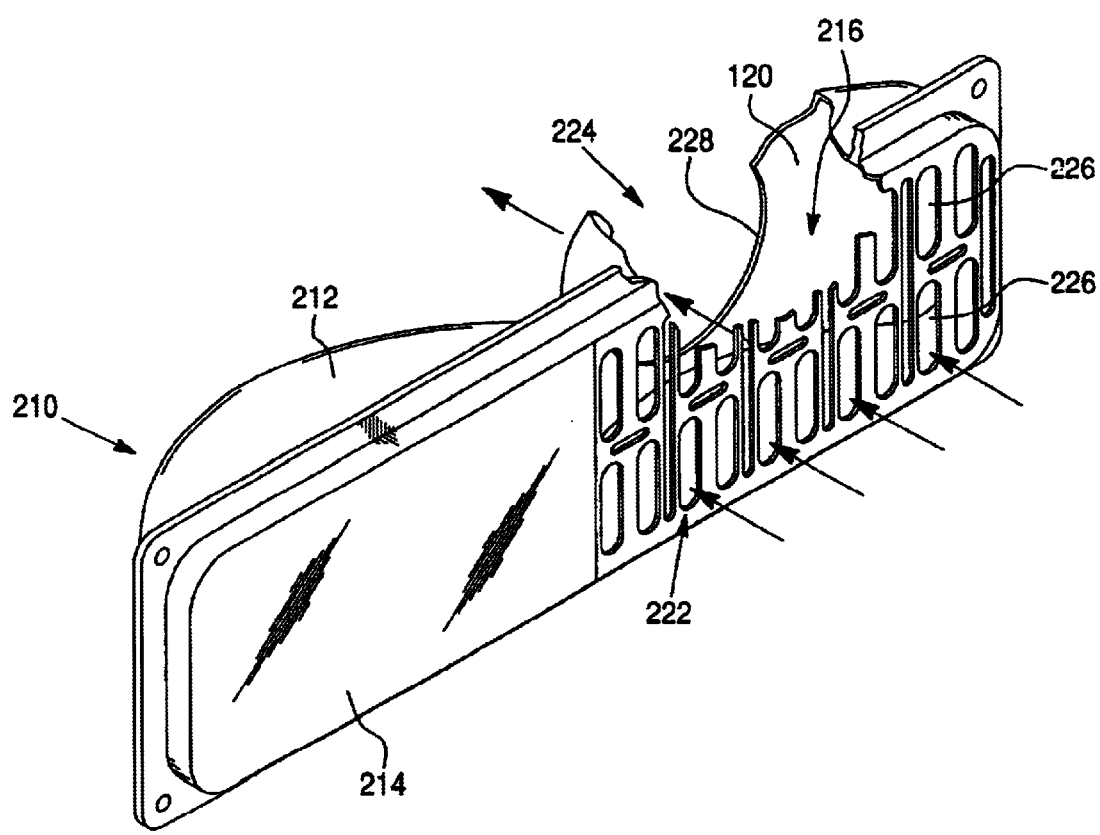
FIG. 7 is a perspective view of a lamp assembly in accordance with the second embodiment of the present invention.
Figure 8:
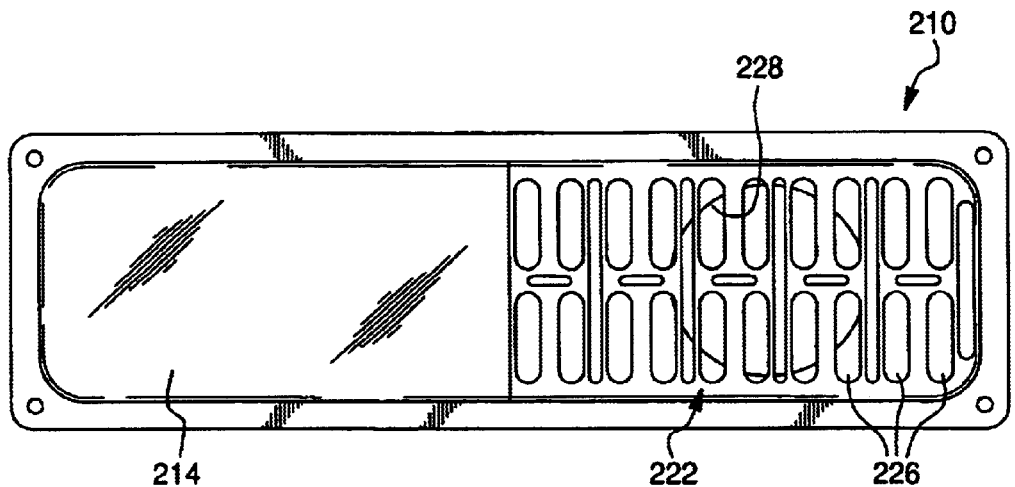
FIG. 8 is a front view of the lamp assembly in accordance with the second embodiment of the present invention.
Figure 9:
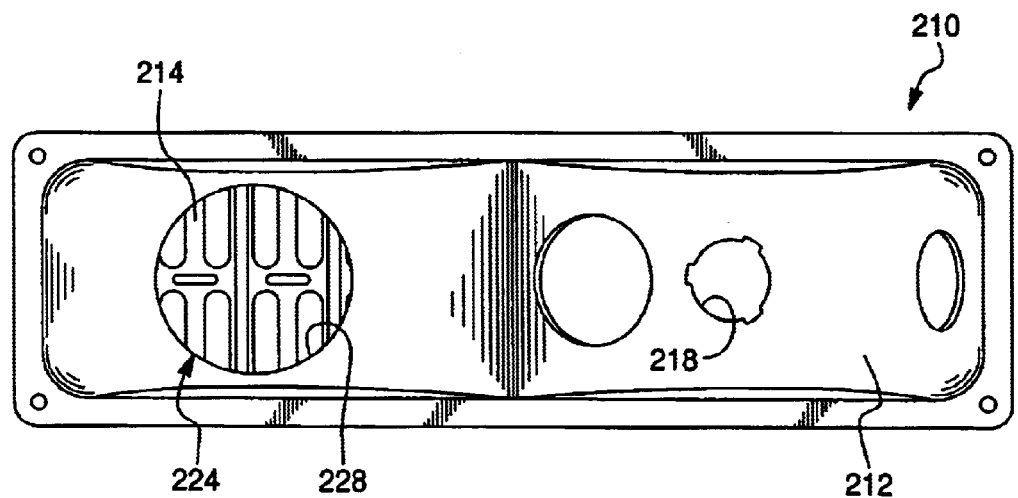
FIG. 9 is a rear view of the lamp assembly in accordance with the second embodiment of the present invention.

As illustrated in detail in FIGS. 7–9, the intake port 222 of the ambient air intake tract is defined by a plurality of apertures 226 formed in the lens member 214. It will be appreciated that the intake port 222 may have any number of apertures 226. Even a single aperture in the lens member 214 may form the intake port 222 provided that it has a cross-section permitting adequate airflow therethrough.

The exhaust port 224 of the ambient air intake tract is defined by an opening 228 formed in the lamp housing 212. It will be appreciated that the exhaust port 224 may consist of a number openings formed in the lamp housing 212.

Ambient air from the exhaust port 224 of the ambient air intake tract of the lamp assembly 210 is supplied to an air filter 118 of the internal combustion engine through an air intake duct 114 disposed substantially above a wheel well 103. The air filter 118 is, in turn, in fluid communication with a turbocharger 124, as shown in FIG. 5. The air intake duct 114 has a first end 116 forming an intake opening 120 and a second end 122 forming an outlet opening. The second end 122 of the air intake duct 114 is attached to the air filter 118.

In operation, as illustrated in FIG. 5, relatively cool fresh ambient air enters each of the two the lamp assemblies 210 through the plurality of the apertures 226 in the lens member 214 defining the inlet port 222, travels through the enclosed cavity 216 in the lamp housing 212, and enters the engine compartment 102 through the opening 228 in the lamp housing 212 defining the exhaust port 224. Then fresh ambient air enters the intake openings 120 of the air intake duct 114, as the intake openings 120 are disposed in close proximity to the openings 228 of the exhaust ports 224 of the lamp assemblies 210. The air intake duct 114 directs ambient air to the air filter 118, then to the turbocharger 124.

With the arrangement of the lamp assembly 210 described above, fresh ambient air enters the engine compartment 102, more particularly the turbocharger 124, bypassing the ambient air inlet 110 and the engine radiator 108. Thus, the present invention provides the turbocharger 124 with substantial amount of relatively cool fresh air not heated by the radiator 108.

Moreover, previously manufactured motor vehicles having conventional air intake system, may be easily retrofit with the lamp assembly 210 of the present invention in order to improve a volumetric efficiency and increase an output power of the internal combustion engine, especially turbocharged diesel engines typically powering heavy-duty trucks.

FIGS. 10–14 of the drawings illustrate the third exemplary embodiment of an apparatus for feeding air to an internal combustion engine of a motor vehicle. Components, which are unchanged from, or function in the same way as in the second exemplary embodiment depicted in FIGS. 5–9 are labeled with the same reference numerals, sometimes without describing detail since similarities between the corresponding parts in the two embodiments will be readily perceived by the reader.

A lamp assembly 310 of the second exemplary embodiment includes a lamp housing 312, and a lens member 314 fastened to the lamp housing 312 by any appropriate means well known in the prior art. The lamp housing 312 forms an enclosed cavity 316 adapted to enclose a light source (not shown) that may be an incandescent, tungsten halogen, HID or similar light source. The light source is coupled through a rear opening 318 in the lamp housing 312 to expose the light source in the enclosed cavity 316, where the generated light is reflected from a reflective portion of the housing 312 and projected forward through the lens member 314 as a formed beam pattern.

The lamp assembly 310 further includes an ambient air intake tract having an intake port 322 and an exhaust port 324 open to the engine compartment 102. The ambient air intake tract, thus, extends between the intake port 322 and the exhaust port 324 through the enclosed cavity 316.

Figure 12:
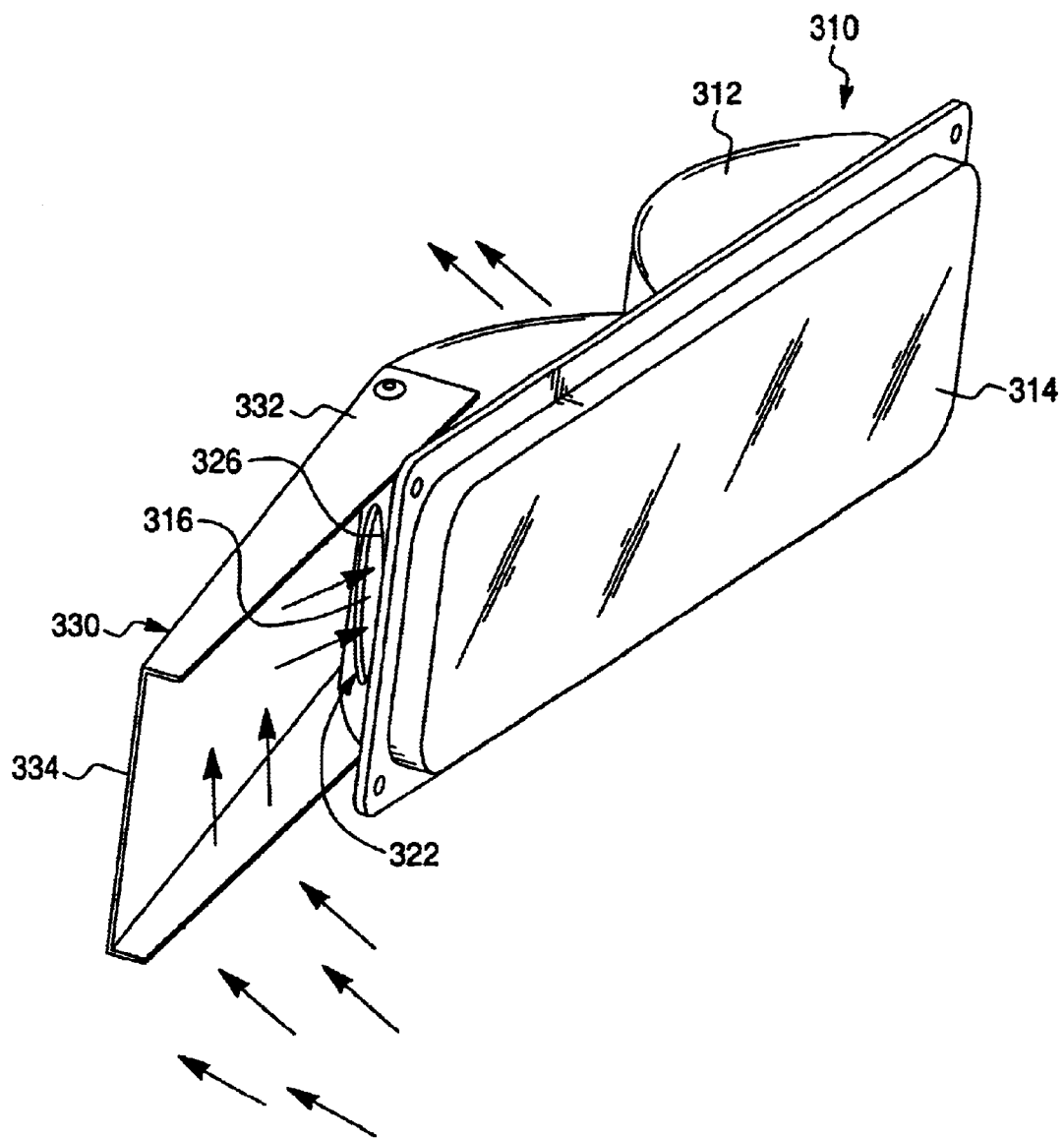
FIG. 12 is a perspective view of a lamp assembly in accordance with the third embodiment of the present invention.
Figure 13:
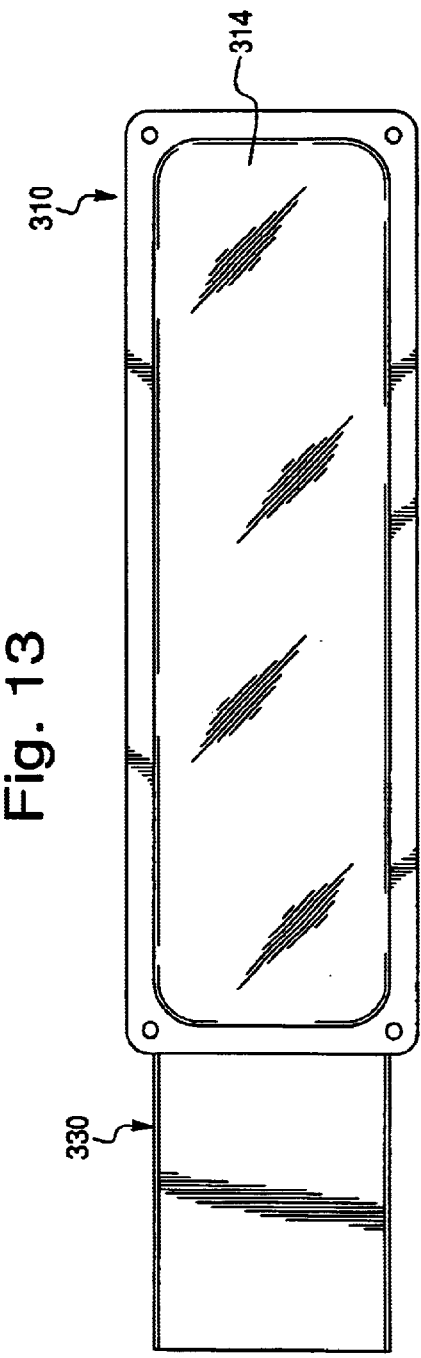
FIG. 13 is a front view of the lamp assembly in accordance with the third embodiment of the present invention.
Figure 14:
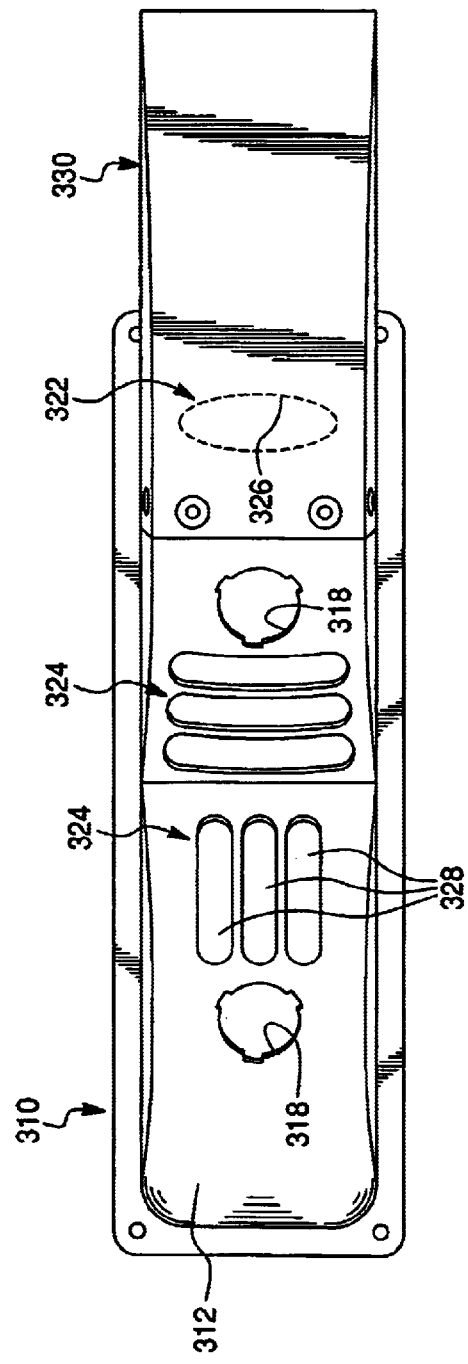
FIG. 14 is a rear view of the lamp assembly in accordance with the third embodiment of the present invention.

As illustrated in detail in FIGS. 12 and 14, an aperture 326 formed in the lamp housing 312 defines the intake port 322 of the ambient air intake tract. Furthermore, the apparatus for feeding air to an internal combustion engine in accordance with the second embodiment of the present invention includes an air deflector 330 provided for directing the ambient air from an ambient air inlet 110 of the truck to the intake port 322 of the air intake tract. The air deflector 330 comprises a proximal end 332 secured to the lamp assembly 310, and a distal end 334 disposed between the ambient air inlet 110 and the radiator 108. The proximal end 332 of the air deflector 330 is attached to the lamp housing 312 by any appropriate means well known in the art, such as riveting, adhesive bonding, etc.

The exhaust port 324 of the ambient air intake tract is, preferably, defined by a plurality of apertures 328 formed in the lamp housing 312. It will be appreciated that the exhaust port 324 may have any number of apertures 328. Even a single aperture 328 may form the exhaust port 324 provided that it has a cross-section permitting adequate airflow therethrough.

Figure 10:
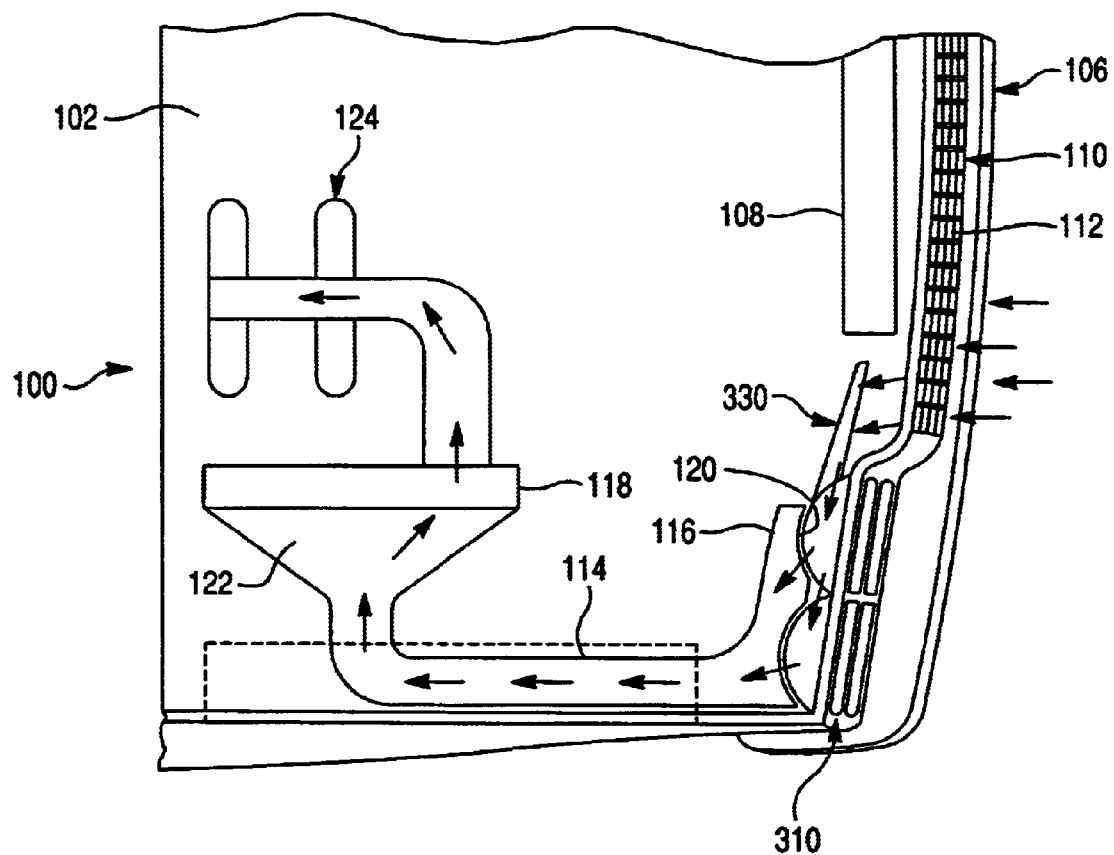
FIG. 10 is a partial plan view of a front end and an engine compartment of a motor vehicle having an air intake apparatus in accordance with the third embodiment of the present invention.
Figure 11:
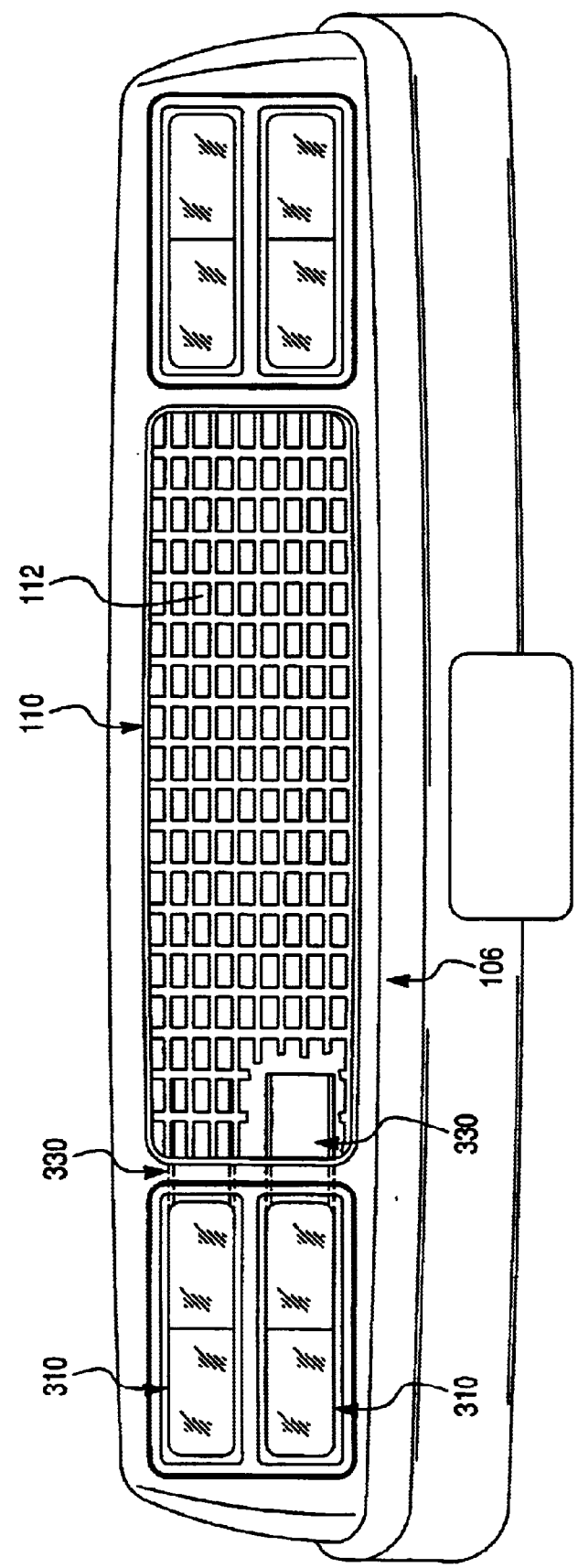
FIG. 11 is a front view of the front panel of the motor vehicle having the air intake apparatus in accordance with the third embodiment of the present invention.

In operation, cold fresh ambient air directed by the air deflector 330 from the ambient air inlet 106 of the motor vehicle, enters the lamp assembly 310 through the apertures 326 in the lamp housing 312, travels through the enclosed cavity 316 in the lamp housing 312, and enters the engine compartment 102 through the openings 328 in the lamp housing 312 defining the exhaust port 324. Then fresh ambient air enters the intake openings 120 of the air intake duct 114, as the intake openings 120 are disposed in close proximity to the openings 328 of the exhaust ports 324 of the lamp assemblies 310, as illustrated in FIG. 10. The air intake duct 114 directs ambient air to the air filter 118, then to the turbocharger 124.

With the arrangement of the lamp assembly 310 described above, fresh ambient air enters the engine compartment 102, more particularly the turbocharger 124, bypassing the engine radiator 108. Thus, the present invention provides the turbocharger 124 with substantial amount of relatively cool fresh air not heated by the radiator 108.

Moreover, previously manufactured motor vehicles having conventional air intake system, may be easily retrofit with the lamp assembly 310 of the present invention in order to improve a volumetric efficiency and increase an output power of the internal combustion engine, especially turbocharged diesel engines typically powering heavy-duty trucks.

FIGS. 15–20 of the drawings illustrate the forth exemplary embodiment of an apparatus for feeding air to an internal combustion engine of a motor vehicle. Components, which are unchanged from, or function in the same way as in the first exemplary embodiment depicted in FIGS. 2–5 are labeled with the same reference numerals, sometimes without describing detail since similarities between the corresponding parts in the two embodiments will be readily perceived by the reader.

A lamp assembly 410 of the third exemplary embodiment includes a lamp housing 412, and a lens member 414 fastened to the lamp housing 412 by any appropriate means well known in the prior art. The lamp housing 412 forms an enclosed cavity adapted to enclose a light source (not shown) that may be an incandescent, tungsten halogen, HID or similar light source. The light source is coupled through a rear opening 318 in the lamp housing 412 to expose the light source in the enclosed cavity within the housing 412, where the generated light is reflected from a reflective portion of the housing 412 and projected forward through the lens member 414 as a formed beam pattern.

The lamp assembly 410 further includes an ambient air intake tract having an intake port 422 and an exhaust port 424 open to the engine compartment 102. The ambient air intake tract, thus, extends between the intake port 422 and the exhaust port 424 through the enclosed cavity within the housing 412.

Figure 15:
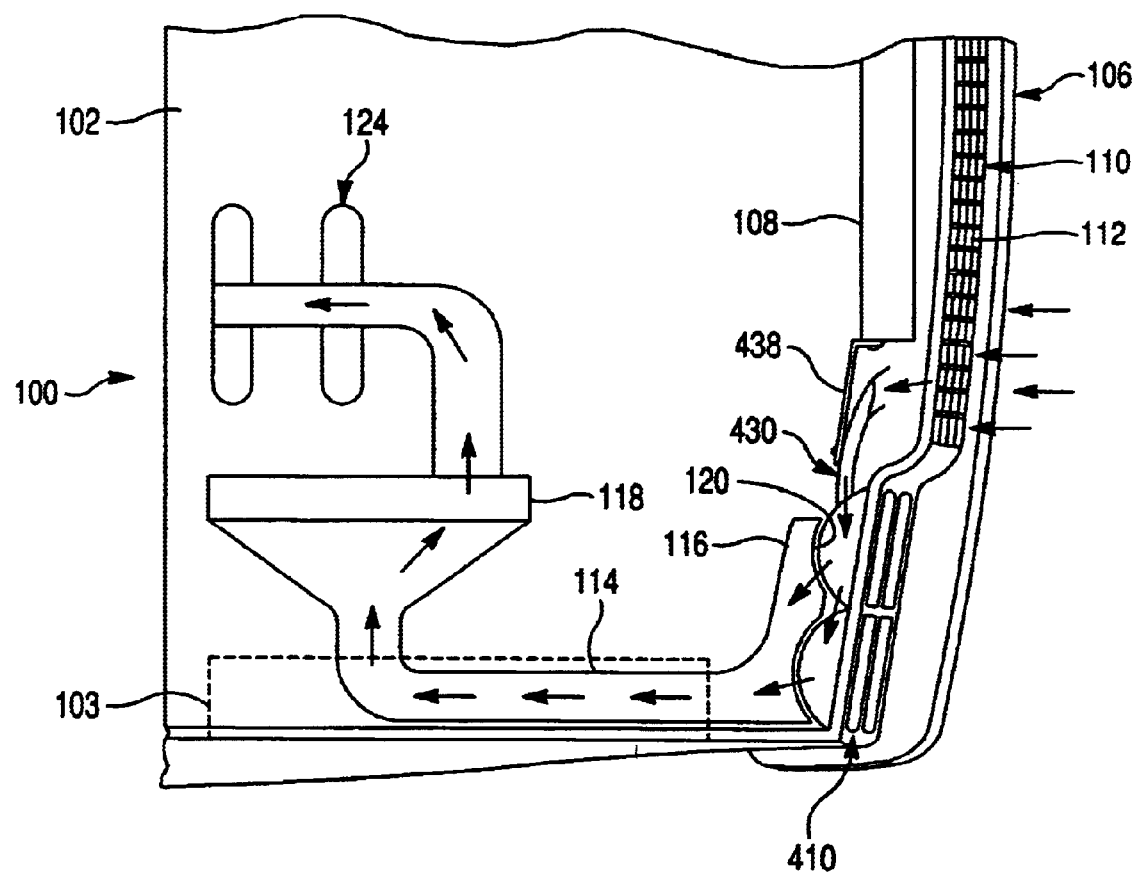
FIG. 15 is a partial plan view of a front end and an engine-compartment of a motor vehicle having an air intake apparatus in accordance with the forth embodiment of the present invention.
Figure 16:
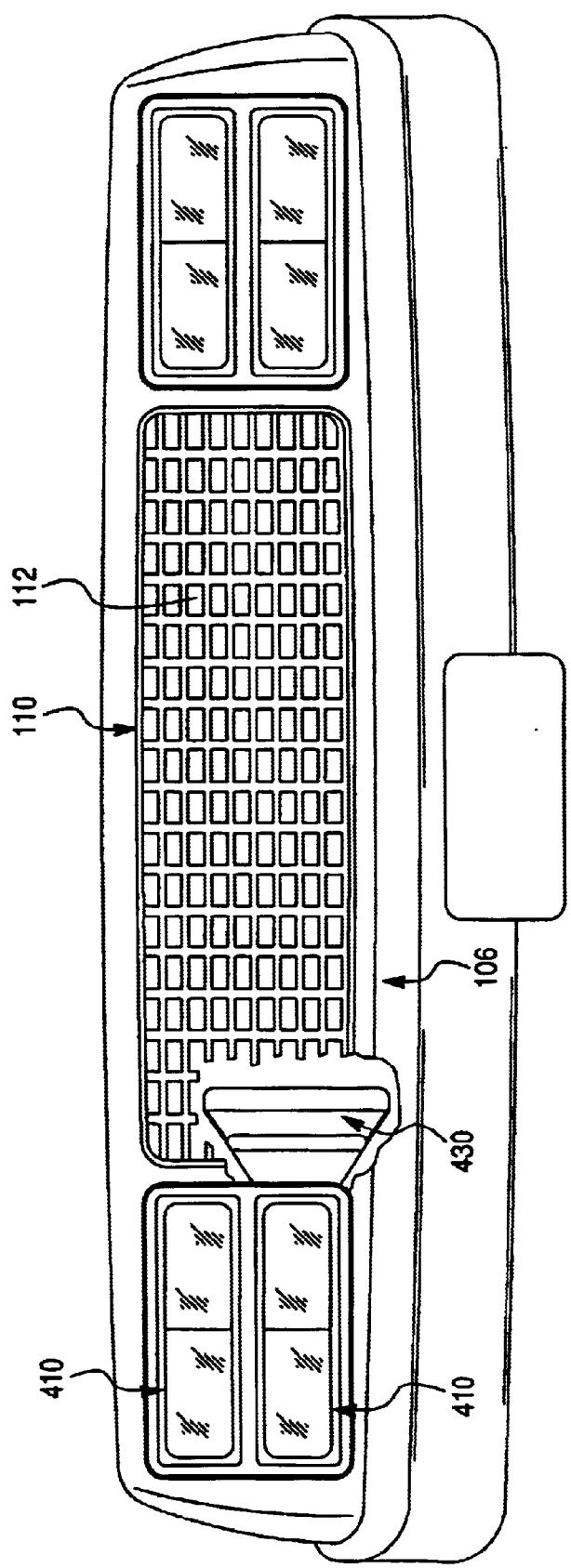
FIG. 16 is a front view of the front panel of the motor vehicle having the air intake apparatus in accordance with the forth embodiment of the present invention.
Figure 17:
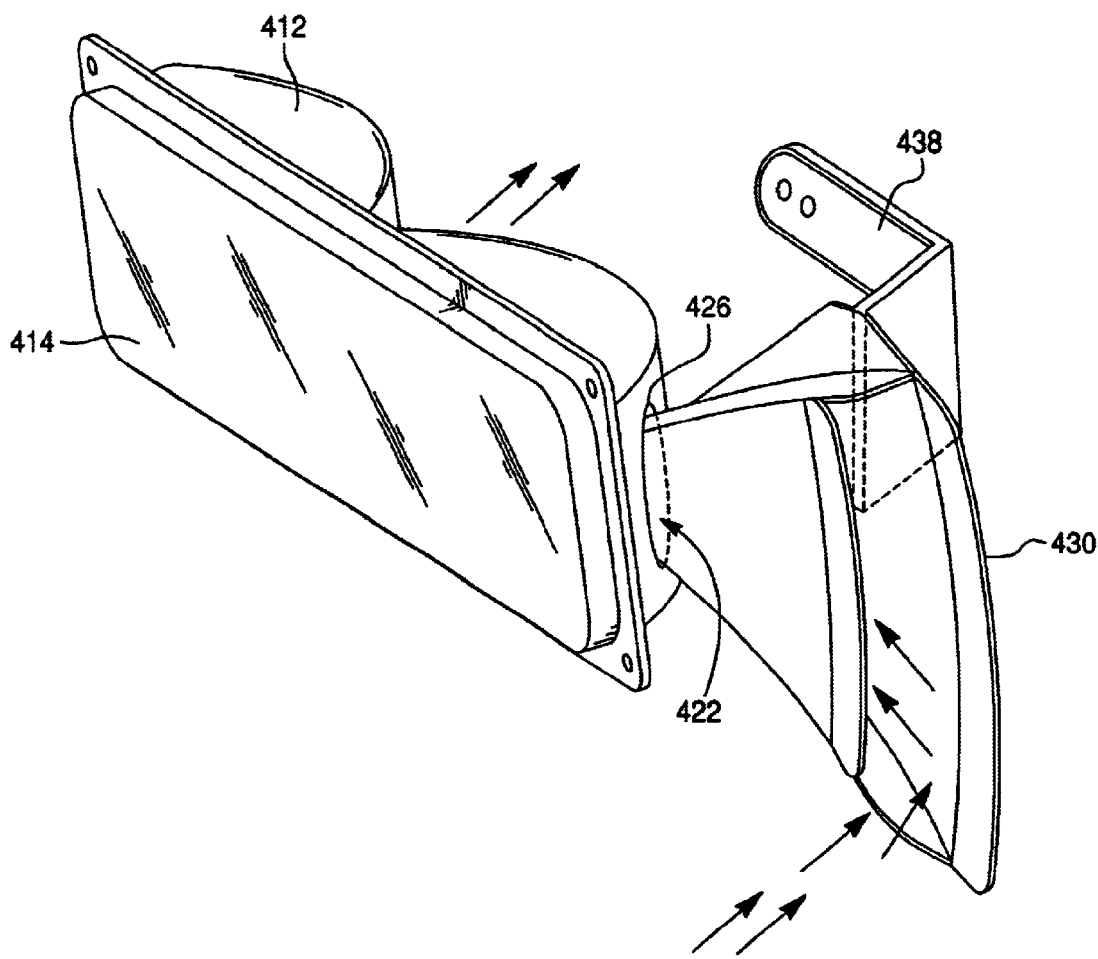
FIG. 17 is a perspective view of a lamp assembly in accordance with the forth embodiment of the present invention.
Figure 18:
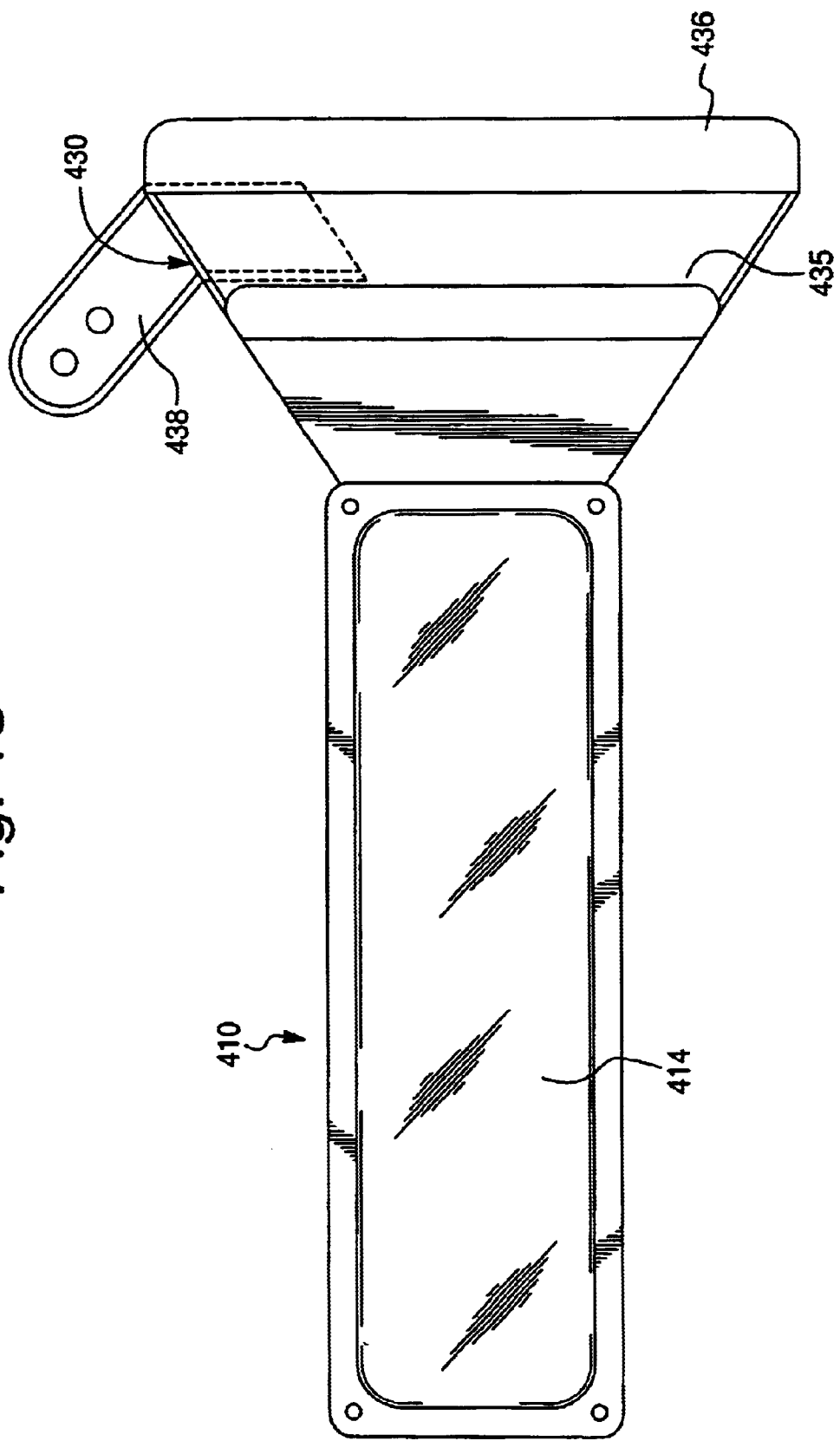
FIG. 18 is a front view of the lamp assembly in accordance with the forth embodiment of the present invention.
Figure 19:
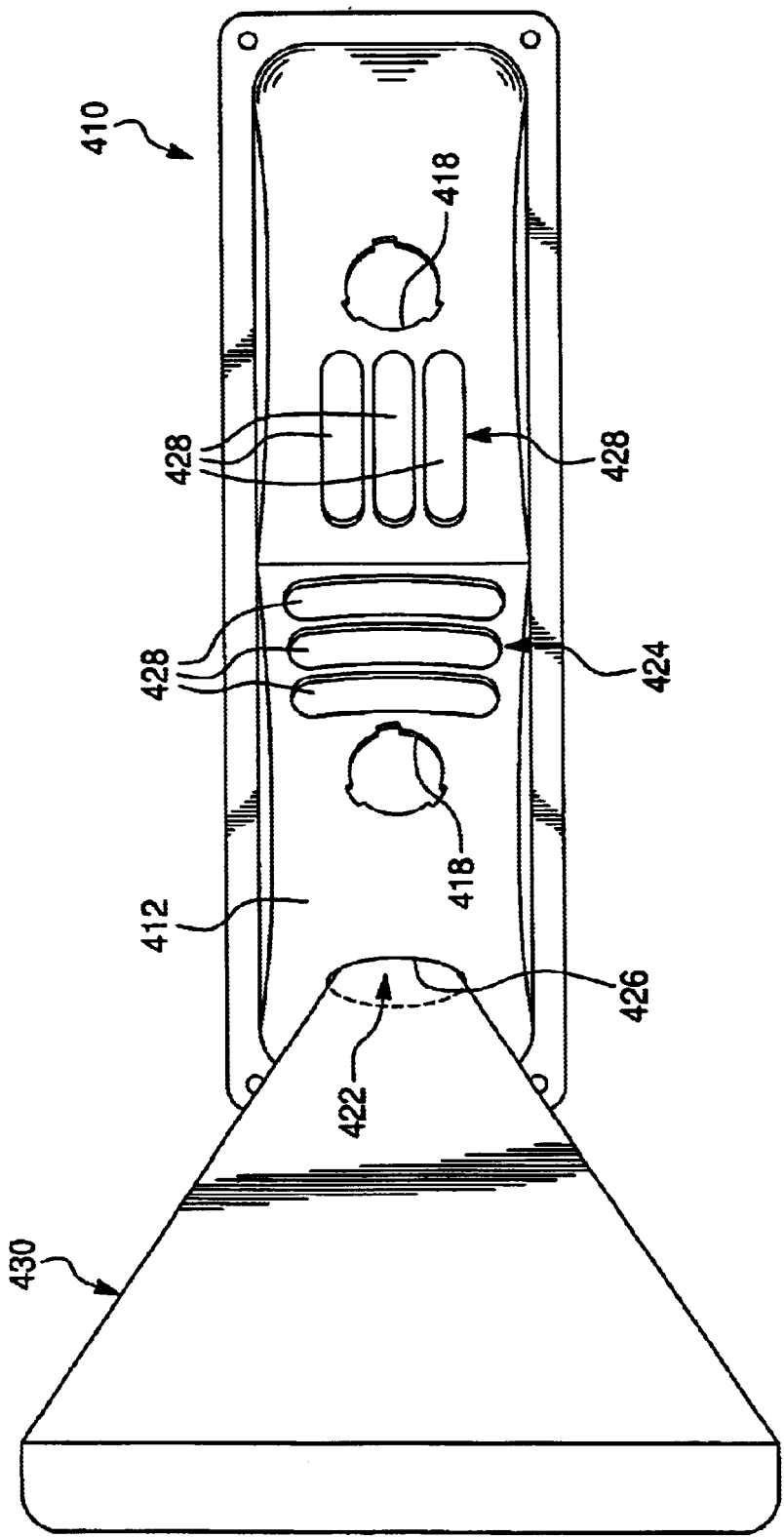
FIG. 19 is a rear view of the lamp assembly in accordance with the forth embodiment of the present invention.
Figure 20:
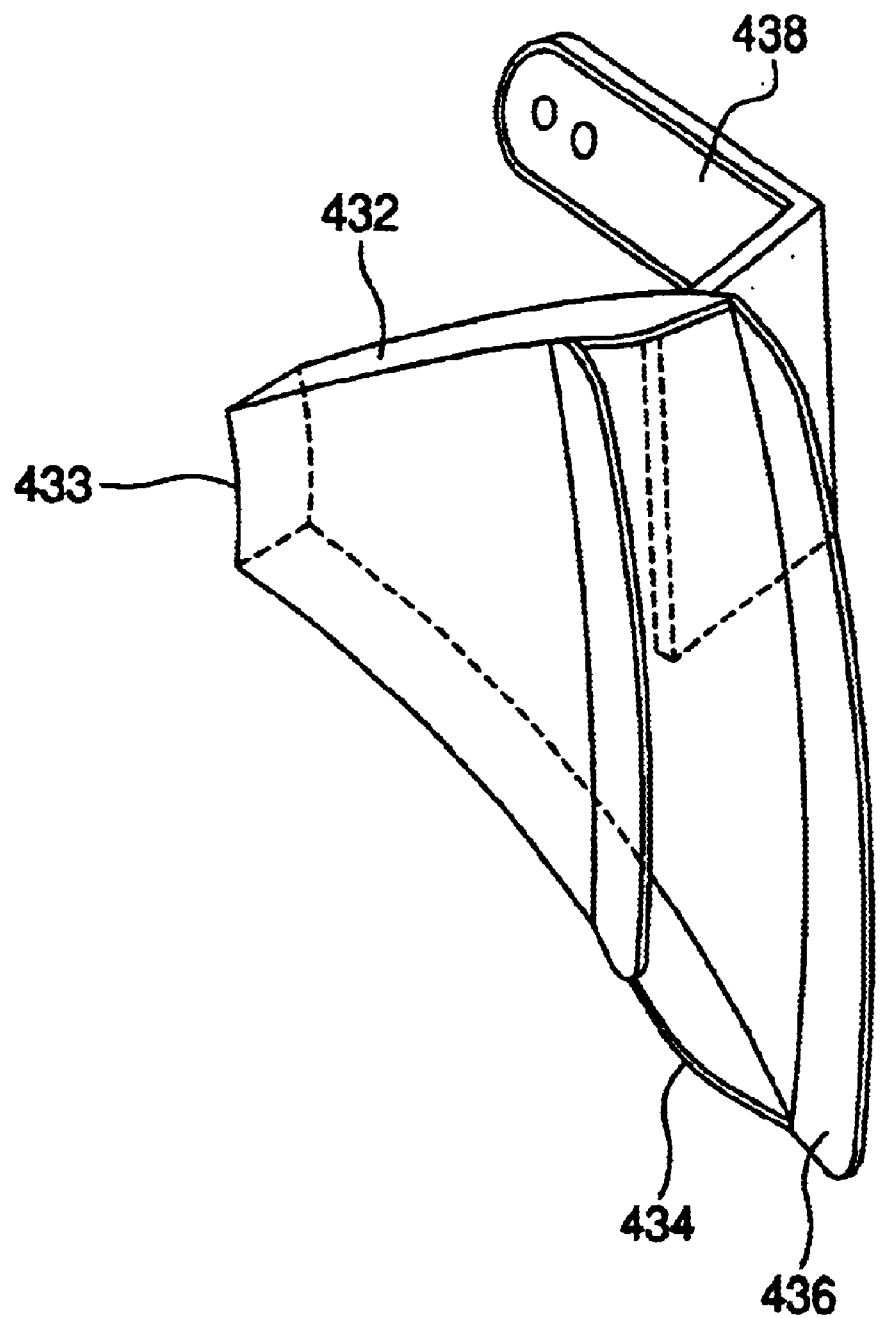
FIG. 20 is a perspective view of an air intake scoop of the lamp assembly in accordance with the forth embodiment of the present invention.

As illustrated in detail in FIGS. 15–17, an aperture 426 formed in the lamp housing 412, defines the intake port 422 of the ambient air intake tract. Furthermore, the apparatus for feeding air to an internal combustion engine in accordance with the third embodiment of the present invention, includes a conical air intake scoop 430 provided for directing the ambient air from an ambient air inlet 110 of the truck to the intake port 422 of the air intake tract. As illustrated in FIG. 20, the air intake scoop 430 is in the shape of a flattened funnel and comprises a proximal end 432 having a first opening 433, and a distal end 434 having a second opening 435. The proximal end 432 of the intake scoop 430 is attached to the lamp housing 412 adjacent to the intake port 422 by any appropriate means well known in the art, such as riveting, adhesive bonding, etc., so that the first opening 433 is substantially aligned with the intake opening 426 of the lamp housing 412. The distal end 434 of the intake scoop 430 is disposed between the ambient air inlet 110 and the radiator 108. Moreover, the distal end 434 of the air intake scoop 330 is provided with an integral air deflector lip 436 laterally projecting therefrom. The air deflector lip 436 is adapted for directing the ambient air from the ambient air inlet 110 of the truck to the second opening 435 of the distal end 434 of the air intake scoop 430.

The air intake scoop 430 further includes a support bracket 438 for securing thereof to a support structure within the engine compartment 102 that may be any appropriate part of the front end 100 of the vehicle, such as the radiator 108 or the front panel 106. The support bracket 438 is fastened to the air intake scoop 430 by any appropriate means known in the art, such as adhesive bonding or welding.

The exhaust port 424 of the ambient air intake tract is, preferably, defined by a plurality of apertures 428 formed in the lamp housing 412. It will be appreciated that the exhaust port 424 may have any number of apertures 428. Even a single aperture 428 may form the exhaust port 424 provided that it has a cross-section permitting adequate airflow therethrough.

In operation, cold fresh ambient air directed by the air deflector lip 436 from the ambient air inlet 110 of the motor vehicle, enters the air intake scoop 430, then the lamp assembly 410 through the apertures 426 in the lamp housing 412, travels through the enclosed cavity within the housing 412, and enters the engine compartment 102 through the exhaust openings 428 in the lamp housing 412. Then fresh ambient air enters the intake openings 120 of the air intake duct 114, as the intake openings 120 are disposed in close proximity to the openings 428 of the exhaust ports 424 of the lamp assemblies 410, as illustrated in FIG. 15. The air intake duct 114 directs ambient air to the air filter 118, then to the turbocharger 124.

With the arrangement of the lamp assembly 410 described above, fresh ambient air enters the engine compartment 102, more particularly the turbocharger 124, bypassing the engine radiator 108. Thus, the present invention provides the turbocharger 124 with substantial amount of relatively cool fresh air not heated by the radiator 108.

Moreover, previously manufactured motor vehicles having conventional air intake system, may be easily retrofit with the lamp assembly 410 of the present invention in order to improve a volumetric efficiency and increase an output power of the internal combustion engine, especially turbocharged diesel engines typically powering heavy-duty trucks.

Therefore, the apparatus for feeding air to an internal combustion engine in accordance with the present invention represents a novel arrangement of the vehicular lamp assembly providing the engine compartment with cool fresh air not heated by the radiator that is particularly beneficial to motor vehicles powered with turbo-charged diesel engines in order to improve their volumetric efficiency and increase output power thereof. Moreover, the present invention could easily retrofit previously manufactured motor vehicles.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An apparatus for feeding air to an internal combustion engine of a motor vehicle, said apparatus comprising:

at least one lamp assembly including a lamp housing forming a cavity, a lens member attached to said lamp housing, and an ambient air intake tract associated with said lamp assembly and extending between an intake port of said tract open to ambient air outside said vehicle and an exhaust port of said tract open to an engine compartment, said ambient air intake tract providing an air communication passage between an exterior of said motor vehicle and said engine compartment;

wherein said internal combustion engine includes an air intake duct for supplying air to an air filter, said duct having a first end forming an intake opening and a second end forming an outlet opening, said intake opening is disposed adjacent to said exhaust port of said air intake tract, said second end of said air intake duct is attached to said air filter.

2. The apparatus as defined in claim 1, wherein said lamp assembly is mounted to a front panel of said motor vehicle.

3. The apparatus as defined in claim 1, wherein said ambient air intake tract is in the form of an air intake scoop adjacent to said lamp housing.

4. The apparatus as defined in claim 1, wherein said intake port of said air intake tract is defined by at least one aperture formed in said lens member.

5. The apparatus as defined in claim 1, wherein said exhaust port is defined by at least one hole formed in said lamp housing.

6. The apparatus as defined in claim 1, wherein said internal combustion engine includes a turbocharger.

7. The apparatus as defined in claim 1, including two adjacent lamp assemblies mounted on one side of said motor vehicle in a transverse direction, each of said lamp assemblies including said ambient air intake tract extending between said intake port of said tract open to ambient air outside said vehicle and said exhaust port of said tract open to said engine compartment.

8. The apparatus as defined in claim 3, wherein said air intake scoop further includes a proximal end adjacent to said housing of said lamp assembly and a distal end disposed adjacent to an ambient air inlet of said vehicle within an engine compartment, said proximal end having a first opening defining said intake port of said air intake tract, said distal end having a second opening defining said exhaust port of said air intake tract.

9. The apparatus as defined in claim 3, wherein said air intake scoop further includes a support bracket for securing thereof to a support structure within an engine compartment of said motor vehicle.

10. The apparatus as defined in claim 3, wherein said air intake scoop is in the form of a flattened funnel.

11. The apparatus as defined in claim 4, wherein said exhaust port is defined by at least one hole formed in said lamp housing.

12. The apparatus as defined in claim 5, wherein said intake port of said air intake tract is defined by at least one hole formed in said lamp housing spaced from said exhaust port.

13. The apparatus as defined in claim 7, wherein first end of said air intake duct is formed of two spaced intake openings, each of said intake openings is disposed adjacent to one of said exhaust ports of said air intake tract.

14. The apparatus as defined in claim 8, wherein said distal end of said air intake scoop is provided with an air deflector lip.

15. The apparatus as defined in claim 12, further including an air deflector for directing the ambient air to said intake port of said air intake tract.

16. The apparatus as defined in claim 12, further including a conical air intake scoop for directing the ambient air to said intake port of said air intake tract.

17. The apparatus as defined in claim 15, wherein said air deflector directs the ambient air to said intake port from a space behind an ambient air inlet of said vehicle.

18. The apparatus as defined in claim 16, wherein said air intake scoop further includes a support bracket for securing thereof to a support structure within an engine compartment of said motor vehicle.

19. The apparatus as defined in claim 16, wherein said air intake scoop further includes a proximal end attached to said housing of said lamp assembly adjacent to said intake port of said air intake tract and a distal end disposed adjacent to an ambient air inlet of said vehicle within an engine compartment.

20. The apparatus as defined in claim 16, wherein said air intake scoop is in the form of a flattened funnel.

21. The apparatus as defined in claim 17, wherein said air deflector further includes a proximal end attached to said housing of said lamp assembly adjacent to said intake port of said air intake tract and a distal end disposed adjacent to an ambient air inlet of said vehicle within an engine compartment.

22. The apparatus as defined in claim 19, wherein said distal end of said air intake scoop is provided with an air deflector lip.

23. An apparatus for feeding air to an internal combustion engine of a motor vehicle, said apparatus comprising:

at least one lamp assembly including a lamp housing forming a cavity, a lens member attached to said lamp housing, and an ambient air intake tract associated with said lamp assembly and extending between an intake port of said tract open to ambient air outside said vehicle and an exhaust port of said tract open to an engine compartment, said ambient air intake tract providing an air communication passage between an exterior of said motor vehicle and said engine compartment;

wherein said ambient air intake tract is in the form of an air intake scoop adjacent to said lamp housing, said air intake scoop includes a proximal end adjacent to said housing of said lamp assembly and a distal end disposed adjacent to an ambient air inlet of said vehicle within an engine compartment, said proximal end having a first opening defining said intake port of said air intake tract, said distal end having a second opening defining said exhaust port of said air intake tract.

* * * * *